United States Patent Office 3,111,011
Patented Nov. 19, 1963

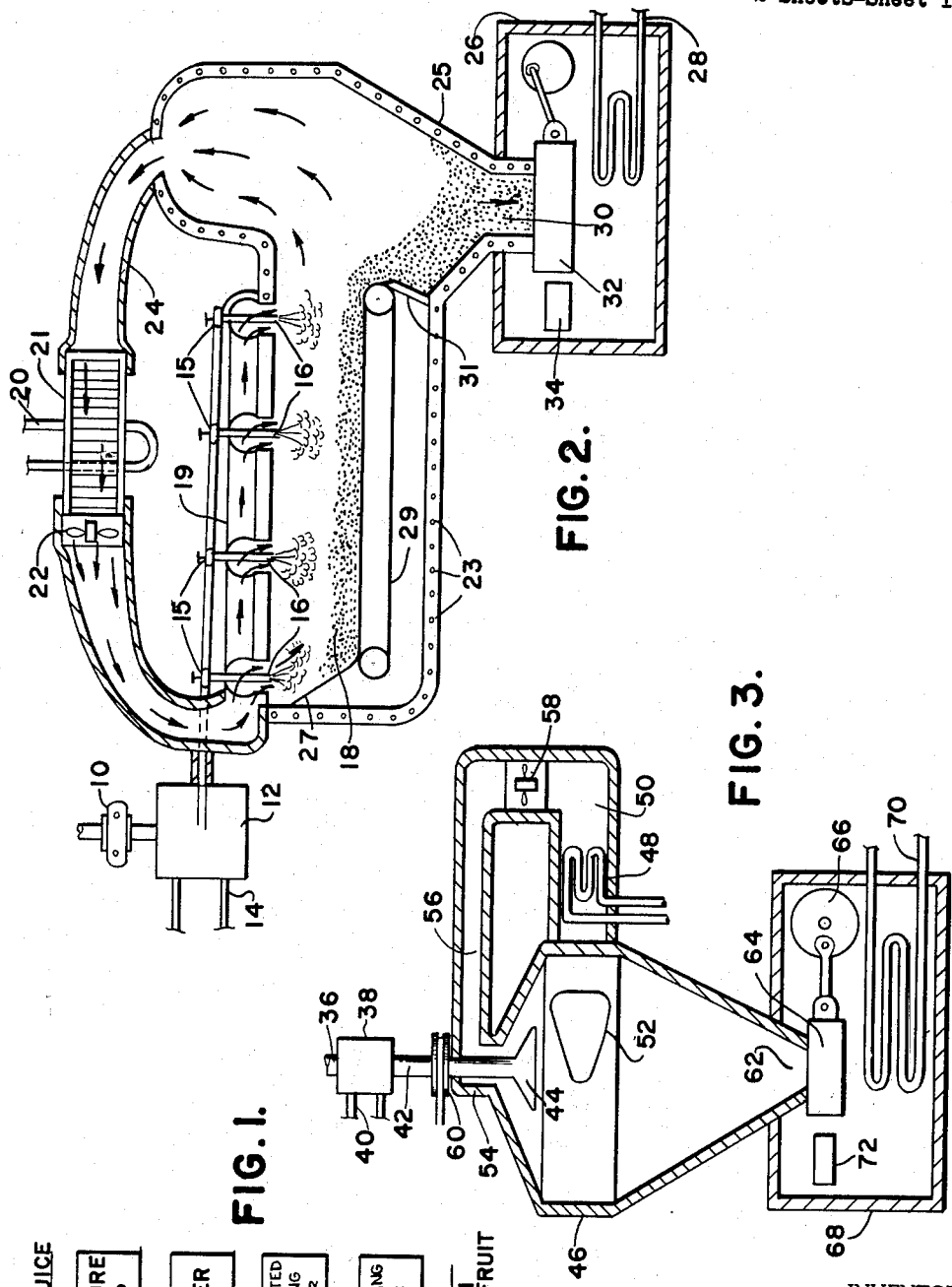

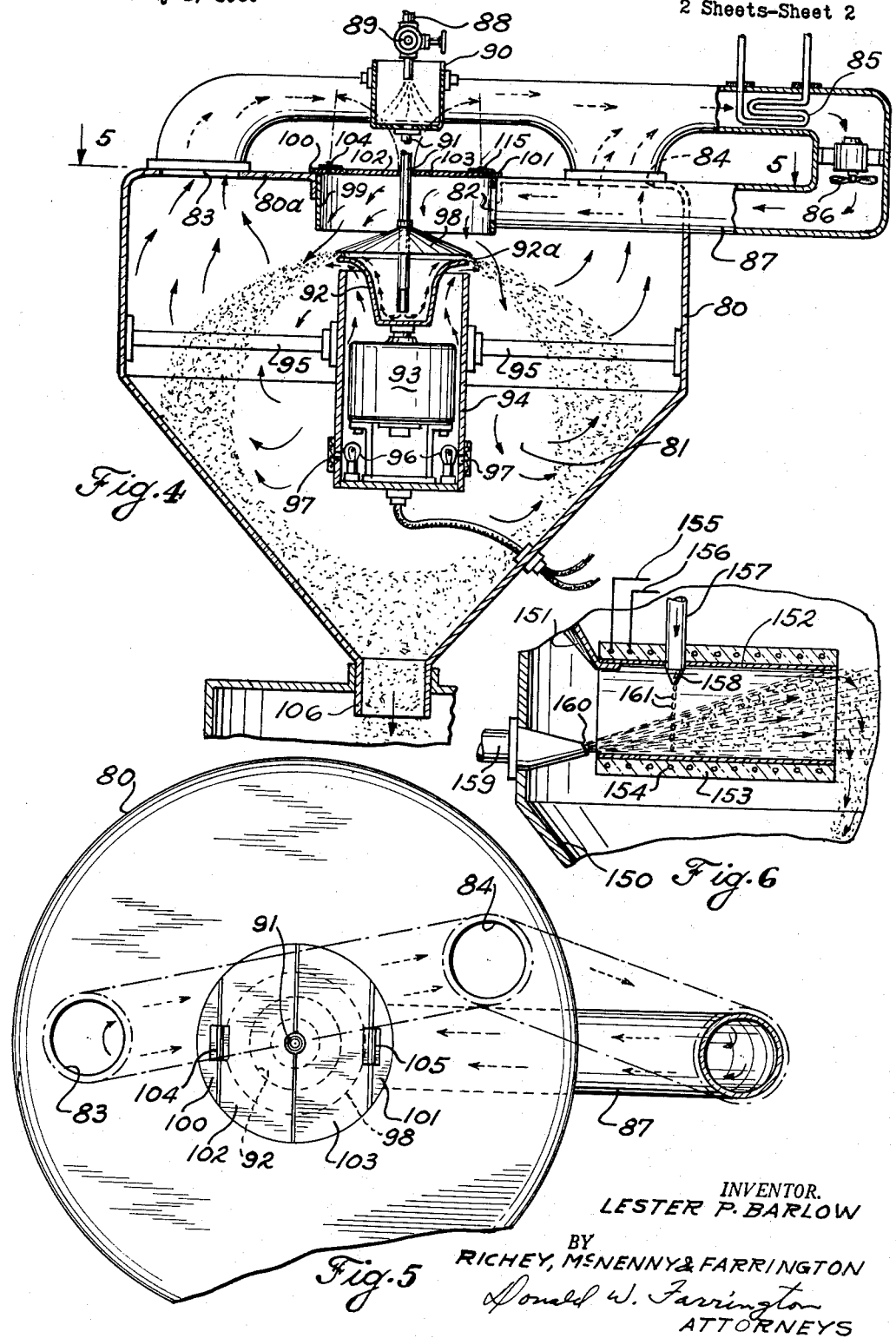

3,111,011
APPARATUS FOR PRESERVING LIQUIDS BY FREEZING
Lester P. Barlow, Stamford, Conn., assignor to Bar-Rup Corporation, Stamford, Conn., a corporation of Connecticut
Filed July 1, 1960, Ser. No. 40,423
2 Claims. (Cl. 62—341)

This invention relates to apparatus for preserving liquids by freezing liquids in a form whereby when the frozen liquid is thawed out, the liquids return to substantially their original state.

The present invention is directed to an apparatus for carrying out the method of preserving citrus fruit juices as disclosed and claimed in my co-pending application Serial No. 774,263, filed November 17, 1958, now Patent No. 3,024,117, of which this application is a continuation-in-part.

Numerous attempts have been made to preserve aqueous liquids containing cellular structures so as to permit the storing of such liquids without flavor loss or other adverse effects for a period of time. The citrus fruit industry has used numerous methods of preserving citrus fruit juices and it is a characteristic of all such prior art methods that the cellular structure of the citrus juice is changed physically and the flavor is adversely affected. Some of such prior art efforts involved the concentrating of the fruit juice by removal of some of the water and thereafter chilling or freezing the remaining liquid. Other prior art methods have involved the freezing of the whole fruit juice and such product is characterized by separation of the constituents of the juice, the loss of volatile aromatic oils, a physical change in the cellular structure and crystallization.

Efforts have also been made to preserve human blood by freezing and water removal methods and some of such methods involving quick changes in pressure have resulted in a destruction of cellular structures in the blood. Also attempts have been made to freeze the whole blood which have resulted in destruction of the cellular structures carried in the blood due to large crystal growth separation of constituents, so that the blood, when thawed out, is unfit for transfusion.

Research in the citrus fruit industry has brought about the general recognition that oxygen is the primary cause of undesirable change in flavor and character of citrus fruit juices. It is known that a citrus fruit, such as orange, includes within the peeling or rind a source of volatile gases which form a gaseous envelope around the orange which prevents the oxygen in the atmosphere from combining chemically with the constituents of the juice within the orange. When the orange peeling dries and the source of the gaseous envelope is exhausted, oxygen readily passes through the skin of the orange and the fruit rapidly deteriorates. When bulk orange juice is frozen in blocks or tanks there is a separation of the constituents of the orange juice. That area of the tank which is last to freeze becomes a concentration of the sugar and the volatile constituents, whereas the portion of the block first to freeze is characterized by large crystals of water. The frozen blocks of orange juice are stored in a refrigerated chamber. Even though such refrigerated chambers are maintained at a temperature as low as —25° C., the sugar and aromatic oil constituents collect at the center of the block and bleed out of the block during storage so that said valuable ingredients contributing to the flavor of the orange juice are lost. Regulations prohibit the addition of sugar by the processor so that unless sugar is added to this type of product by the consumer, it does not have the sweetness of fresh orange juice. The aromatic oils, of course, are lost and cannot be recovered or added to the product when used.

When orange juice is concentrated by the vacuum process so as to reduce the water content for packaging and shipping, the vacuum process removes, along with the water, the volatile and aromatic constituents. Numerous attempts have been made to capture the aromatics and volatile vapor ingredients and return such components to the concentrate after the water has been removed. It appears that all of these efforts have failed and accordingly the orange juice concentrate resulting from the vacuum method does not correspond to the natural orange juice in flavor, taste and aroma when the water is added by the consumer.

Numerous attempts have been made to provide vapor-proof paper cartons for orange juice and, since the oxygen of the atmosphere migrates freely through the walls of such cartons, such attempts have been generally abandoned by the industry. Metal and glass containers, while effective as a barrier against oxygen, are not acceptable to the industry for costs and other reasons. Difficulty is encountered with metal and glass containers due to the expansion of the product upon freezing. Even though the processor of the orange juice maintains a low temperature above freezing for the juice in the metal or glass container, the user may place the container in a deep freeze and thus produce the expansion sufficient to destroy the container. As will appear in the following statement of objects and in the description of my invention, a juice product prepared by the apparatus herein disclosed may be stored at a much higher temperature than the prior art products. For example, the product prepared with my apparatus may be efficiently stored without adverse effects at a temperature of 0° F. to 10° F. above 0° F.

The importance of this will be appreciated when it is understood that the cost of reducing the temperature from 0° F. to —25° F. is greater than the cost of bringing the same chamber down from 70° F. to 0° F. Accordingly the product of my apparatus provides substantial savings in storage and handling.

According to the present invention apparatus is provided for continuously moving a mass of chilled gas through a path in a refrigerated chamber. This mass of cold gas is moved through a path which includes a heat exchanger so as to maintain the cold mass of gas at a temperature of about —25° F. A part of the path, such as, for example, the portion of the path where the heat is removed from the gas, may be outside of the refrigerated chamber. The gas remains at a substantially constant pressure approaching atmospheric pressure and functions somewhat in the manner of a conveyor belt carrying heat from one area of the chamber to the heat exchanger where such heat is removed from the gas. Means are provided to introduce the liquid to be preserved to this cold gas in minute particles such as, for example, one-half to five hundred microns in diameter. Each of such minute particles may include cellular structure characteristic of the liquid prior to its dispersion into such fine particles. The dispersion of the liquid may be accomplished by spraying means or centrifugal means throwing the liquid into the cold gas. The minute particles of liquid are quickly frozen which prevents damaging crystal growth, while suspended and moving in said cold gas. Such particles are generally spherical and appear to be frozen in a form having such minute crystal size that the cellular structures carried in the liquid are not changed physically. Such frozen particles are then collected with the refrigerated chamber, usually by falling by gravity into a hopper, and means are provided to compress the particles in a convenient brickette. It appears that each particle or minute sphere of frozen liquid is characterized by a film or envelope of the cold gas. Where the liquid being preserved is a citrus juice, the cold gas employed may be nitrogen, which is inert with respect to constituents of the citrus juice. The cold gas should be selected with respect to the material being preserved and, with many liquids air may be used.

It is among the objects of this invention to provide an apparatus for preserving liquids wherein means for moving a refrigerated mass of gas within a chamber is provided and wherein means are provided to disperse the liquid to be preserved in said refrigerated mass of gas and wherein means are provided for collecting the particles which are frozen while suspended in said refrigerated mass of gas.

It is a further object of this invention to provide apparatus for preserving liquids wherein a refrigerated chamber is provided with a circulating mass of cold gas and wherein the gas is continuously being chilled in its circulating path and wherein dispersions means within the chamber disperses the liquid to be preserved in minute particles and such particles are thrown into said moving gas and wherein means are provided for collecting and compacting the frozen particles carried by said gas.

It is a further object of this invention to provide an apparatus according to the preceding object wherein the liquid to be preserved is sprayed into the moving path of the gas and wherein the gas is inert with respect to the liquid which is to be preserved.

It is a further object of this invention to provide an apparatus according to the preceding objects wherein the liquid to be preserved is introduced into the chamber at the center of a rotating member and wherein the liquid is dispersed by centrifugal throwing of the liquid particles into the refrigerated gas.

Further objects and advantages of this invention will be apparent from the following detailed description of certain presently-preferred embodiments thereof, which are illustrated in the accompanying drawings.

In the drawings:

FIG. 1 is a block diagram of a process of freezing fruit juice by the use of the apparatus of the present invention;

FIGURE 2 is a diagrammatic illustration of a first embodiment of the present apparatus;

FIGURE 3 is a diagrammatic illustration of a second embodiment of the apparatus of the present invention;

FIGURE 4 is a similar view showing a third embodiment of the apparatus of the present invention; and FIGURE 5 is a view taken along the line 5—5 in FIG. 4.

FIG. 6 is an elevation with parts in section of a form of apparatus particularly useful in preserving human blood.

Referring first to FIG. 2, the apparatus shown therein is particularly suitable for carrying out the process of freezing fruit juice in accordance with the process shown in block diagram form in FIG. 1. However, it is to be understood that this same apparatus may also be used for freezing various other types of liquids other than fruit juices.

In the apparatus of FIG. 2, the liquid which is to be frozen is supplied to a suitable pump 10 whose output is connected to a cooler 12. The pump places the liquid under a super-atmospheric pressure which lowers the freezing point of the liquid, as, for example, a pressure of 100 pounds per square inch. Preferably, the liquid is pre-cooled to some extent before entering the pump 10. In the cooler 12 the temperature of the liquid is further reduced by a suitable conventional refrigerating means, such as a coil 14. Desirably the temperature of the liquid is reduced in the cooler 12 to a temperature of a few tenths of a degree Fahrenheit below its freezing point at atmospheric pressure, but above its freezing point at the above-atmospheric pressure to which it is subjected.

From the cooler 12 the pressurized liquid flows through valve 15 to one or more atomizing nozzles 16. The liquid is sprayed by these nozzles into a freezing chamber 18 in the form of a mist or fog of extremely minute, finely divided particles.

The atomizing nozzles 16 extend through ports in a conduit 19 through which flows a suitable cooled gas at an extremely low temperature. These ports serve to admit the cooled gas into the freezing chamber 18 in immediate proximity to the discharge ends of the respective atomizing nozzles 16.

In the case of orange juice, preferably the majority of the liquid particles sprayed into the cooling chamber by the atomizing nozzles 16 should be from one-half to five hundred microns in diameter. While it is desirable that the majority of the liquid particles fall within this size range, the existence of a small number of larger particles does not have any substantial adverse effect. In accordance with the present invention, the particles should freeze while spaced from each other, and preferably they freeze in from one-hundredth to two-hundredths of a second after leaving the atomizing nozzle at a speed of approximately one hundred miles per hour. With the juice particles traveling at that speed and frozen at that rate, the juice is frozen in less than five feet of travel from the atomizing nozzle. The freezing chamber 18 is made large enough to prevent any juice particles from contacting any wall of the chamber before freezing.

In accordance with the present invention, the cooled gas is of a type which is passive or non-detrimental to the particular liquid which is to be frozen. That is, the cooled gas does not react with the liquid in such a way as to produce any substantial deterioration in the properties of the liquid which it is desired to preserve. In the case of orange juice, for example, the cooled gas may be nitrogen or helium.

In such event, the temperature in the freezing chamber 18 preferably is maintained at between $-10°$ F. and $-50°$ F. This temperature may be established and maintained by any suitable means, such as a cooling coil 20, heat exchanger 21 and recirculating fan or turbine 22 which recirculates the gas in the freezing chamber continuously. The fan or turbine 22 draws the gas from the freezing chamber 18 through return conduit 24 and, after the returned gas has passed over the heat exchanger 21 and is further cooled thereby, it is discharged through conduit 19 into the freezing chamber 18 again. The cold gas is kept in motion by the fan or turbine 22.

The walls of the freezing chamber 18 are refrigerated by circulating a refrigerant through pipes 23 embedded in these walls.

With this particular arrangement, the individual finely divided liquid particles are contacted by the cooled gas in the freezing chamber substantially immediately upon being discharged from the nozzles 16 and they freeze substantially immediately as individual, separate, extremely small particles. This extremely quick freezing is due to their substantially immediate contact with the cooled gas and the fact that the pressure on the liquid particles is relieved as they emerge from the nozzle, so that the freezing point of the liquid rises.

Because the liquid is in a finely divided condition and because each liquid particle is separated from the others by a gas-filled space, large water crystals are prevented from forming and any small water crystals which may form are prevented from puncturing the liquid particles because they are unable to press the liquid particles against other crystals.

It should be noted that the cooled gas in the freezing chamber 18 is in a gaseous state at all times. It does not expand from a liquid state to a gaseous state for absorbing heat as in the conventional refrigeration cycle. Instead it undergoes very little pressure change as it is continuously re-circulated through the freezing chamber and the return conduit, absorbing heat from the liquid particles which it freezes and then being cooled by the heat exchanger 21. In the heat exchange which takes place between the liquid particles discharged by the nozzles 16 and the cooling gas there is no refrigerating cycle in the conventional sense, because the cooling gas is in a gaseous state before, as well as after, its absorption of heat from the liquid particles.

The frozen liquid particles gravitate downward within the freezing chamber, being guided by a suitable baffle 27 onto a flexible, endless conveyor belt 29 which deposits them into a chute 25 at the lower end of the freezing chamber 18. The conveyor belt 29 should be of a material which will withstand the cold temperature to which it is subjected, a plastic filled nylon cloth being suitable for this purpose. A member 31 is arranged at the right-hand end of the conveyor belt so as to deflect the particles from the conveyor belt 29 downwardly to the mouth of the chute 25.

The lower end of the chute 25 is enclosed in a cooled chamber 26 which is maintained at a temperature below the freezing point of the liquid particles at atmospheric pressure, and preferably substantially the same as the temperature in the freezing chamber 18. To this end, a suitable cooling coil 28 is provided.

The frozen powdered liquid issuing from the mouth 30 of the chute 25 is fed to a suitable bricketting mechanism 32, which may be of the type shown in U.S. Patent No. 663,502. This mechanism produces bricks or blocks 34 of frozen liquid which may be removed from the chamber 26 by any suitable means, not shown.

The pressure of bricketting is sufficient to exclude gas from between the frozen liquid particles, and may be of the order of 500 pounds per square inch. In the case of frozen fruit juice, the bricks or blocks may be packaged in waxed cartons or any other suitable manner.

FIGURE 3 shows an alternative embodiment of the freezing apparatus of the present invention. In this embodiment the liquid to be frozen is fed into an inlet pipe 36 and thence over a heat exchanger 38 whose temperature is established by any suitable cooling means, such as coil 40. From the heat exchanger the liquid passes to the inlet 42 of a rotating spray head 44 in a spray dryer type apparatus.

This apparatus includes a vessel 46 which encloses a freezing chamber which is maintained at a temperature low enough to cause substantially instantaneous freezing of the small liquid particles discharged by the spray head 44. The freezing chamber is cooled by a suitable cold gas which is discharged in a gaseous state into the freezing chamber through a tangential inlet 52 after passing over a cooling coil 48 in a conduit 50. At the top of the vessel 46 a return outlet 54 leads into a return conduit 56 going to a recirculating fan 58.

The spray head 44, which may be of any suitable conventional type which will produce a fog or mist of liquid particles, is driven by any suitable means, such as a motor-driven pulley 60.

An outlet 62 at the lower end of the vessel 46 feeds into a bricketting mechanism 64 driven by an eccentric 66 and enclosed in a cooled chamber 68 which is maintained at a temperature below the freezing point of the frozen liquid particles at the pressure to which they are subjected in the vessel 46. The finished brickettes 72 are removed from the chamber 68 by any suitable means, not shown.

In this particular embodiment the liquid to be frozen is cooled while in the pipe 42 due to the latter's exposure to the cold gas in the upper end of vessel 46. Since it is essential to the proper operation of the apparatus that no freezing of the liquid occur until it is dispersed through the nozzle 44 into the freezing chamber, the heat exchanger 38 is used to cool the incoming liquid to a temperature approaching freezing temperature but sufficiently above such freezing temperature to prevent freezing of the liquid before it is discharged by the spray head 44.

Essentially the same advantageous quick freezing of the liquid in the form of individual, separate, extremely small particles takes place in the apparatus of FIG. 3 as in the first-described embodiment. Here again, the cold gas which freezes the liquid particles is in a gaseous state at all times as it is repeatedly circulated through the freezing chamber.

A still further embodiment of the apparatus of the present invention is shown in FIGS. 4 and 5. Here the apparatus comprises a vessel 80 which encloses a freezing chamber 81. A suitable cooled gas is discharged into the freezing chamber through an inlet 82 at the top near the center of the vessel 80.

The cooled gas returns from the freezing chamber by way of a pair of outlets 83 and 84 in the top of the vessel 80 near opposite sides thereof. The gas is drawn through these outlet openings and across a cooling coil 85 by the action of a recirculating fan 86, which discharges the gas through an inlet conduit 87 leading to the inlet opening 82.

With this arrangement, the cooled gas is continuously circulated through the freezing chamber 81 at a relatively low pressure and at a sufficiently low temperature to effect substantially instantaneous freezing of the liquid which is to be frozen.

The liquid which is to be frozen passes through an inlet pipe 88 and thence through a shutoff valve 89 into a receptacle 90 which is fixedly supported above the top of the vessel 80. From the lower end of this receptacle 90 the liquid passes down through a pipe 91 into a spinner 92 disposed inside the vessel 80. The spinner 92 is a receptacle which is open at its upper end and has upwardly extending sides which flare laterally outward at the upper end of the receptacle. The spinner 92 is detachably coupled to the output shaft of an electric motor 93 which rotates the spinner at a velocity sufficient to cause the incoming liquid to be thrown centrifugally and upwardly out of the spinner 92 at high velocity in the form of finely divided particles which produce a fog or mist in the freezing compartment 81.

The stationary pipe 91, which passes the liquid down into the spinner 92, carries a downwardly and laterally outwardly inclined baffle 98 which is spaced above the open upper end of the spinner 92. This baffle is positioned to deflect the liquid particles discharged from the spinner laterally outwardly and downward into the freezing chamber 81. Also, this baffle deflects the incoming cold gas toward the spray of liquid particles being discharged into the freezing chamber 81.

The motor 93 is fixedly mounted in a support 94 which is fixedly supported from the sides of the vessel 80 by means of a plurality of laterally extending support arms 95.

In order to prevent freezing of the liquid on the outside of the spinner 92, a suitable heat source for the spinner is provided in the form of a pair of electric light bulbs 96 mounted in the bottom of the motor support 94. A pair of small screened inlets 97 in the support 94 permit the gas to flow past these lamps, so as to produce an upward flow of heat which is sufficient to prevent freezing of the liquid on the outside of the spinner. The rotation of the spinner tends to cause heat to flow beneath the peripheral flared lip 92a on the upper end of the spinner 92.

The inlet opening 82 for the cold gas is located in an annular wall 99 which is supported by the top wall 80a of the vessel 80. At opposite sides the depending annular wall 99 is connected to segmental, flat, horizontal, upper end pieces 100 and 101, respectively. These horizontal pieces 100 and 101 rest on top of the vessel top wall 80a, as shown in FIG. 4, and are fixedly connected thereto, such as by welding. A pair of plates 102 and 103 are hinged at 104 and 105, respectively, to the segmental pieces 100 and 101. These plates abut against each other to close the upper end of the vessel 80. At the middle of their meeting edges they are formed with semi-circular recesses which snugly receive the pipe 91 extending down into the vessel.

With this arrangement, the hinged plates 102 and 103 may be lifted upwardly about their respective hinges 104 and 105 for convenient removal of the inlet pipe 91 and deflector baffle 98 from the freezing chamber, after which the spinner 92 may be lifted up out of the freezing chamber for servicing.

In the operation of this apparatus, the same advantages are obtained as described in more detail in the discussion on FIG. 2, particularly the substantially instantaneous freezing of the liquid in the form of individual, finely divided particles which gravitate down to the lower end of the vessel 80, from which they are discharged through an outlet 106. The cold gas which freezes the liquid particles is in a gaseous state at all times, both before and after contacting the liquid particles. After being discharged through the outlet 106, the individual frozen liquid particles may be compacted into blocks by a bricketting mechanism of the type illustrated schematically in FIGS. 2 and 3.

From the foregoing description it will be apparent that each of the illustrated embodiments of the present apparatus is well suited for the accomplishment of the stated purposes of this invention.

In the case of fruit juices, by using the apparatus of the present invention the juice returns to its original emulsified state when it thaws, instead of separating, so that its original flavor and stability remain substantially unchanged. After being frozen and compacted into blocks, as described, the fruit juice may be stored at temperatures now ordinarily used in transportation and commercial operations with other frozen foods. Also, it may be stored in home freezers without substantially deteriorating.

While the present invention should not be construed as being limited by any particular theory of operation, it is believed that these novel and advantageous results are due to the substantial absence from the frozen product of water crystals which might tend to rupture the individual particles of the original liquid which contain flavoring oils in an emulsified form. The substantial absence of such water crystals is due to the rapid freezing of the individual particles in their finely divided state by their immediate contact with the cold gas in the freezing chamber.

A modified form of apparatus is shown in FIG. 6 which form is particularly designed for the preservation of human blood. The usual refrigerated chamber having enclosing walls 150 has mounted therein by means of bracket 151 a metal tube 152. The metal tube is surrounded by a wall of insulating material 153 and within the insulating material a resistance heater is arranged as at 154. The electrical lines 155 and 156 lead to a source of electric power so as to heat the tube 152 and maintain the temperature of the tube 152 above about 32° F.

In this form of my invention the blood to be preserved is not subjected to pressure as by spraying or by centrifugal forces as in the apparatus of FIG. 4. The blood enters the refrigerated chamber through a vertical pipe 157 terminating in a small orifice at 158 within the tube 152. The cold gas, preferably nitrogen, may be chilled by the apparatus as shown in FIG. 4 and is introduced to the refrigerated chamber by pipe 159 which terminates in nozzle 160.

In this apparatus the drops of blood falling as at 161 fall into the stream of rapidly moving cold inert gas. The velocity of the gas in the area where the drops fall is such that the drops are broken up into a finely divided mist or spray and the finely divided particles are temporarily entrained in the cold gas where such particles are individually frozen and fall to the bottom of the refrigerated chamber where they are gathered and compacted as heretofore described. This apparatus is to be distinguished from spray nozzle apparatus where the pressure is reduced below atmospheric pressure so as to draw fluid upwardly into a spray nozzle. In this apparatus the blood is not subjected to any pressure and merely falls by gravity into an area of rapidly moving cold gas. The gas is under no appreciable pressure above atmospheric pressure but is characterized by high velocity. The worm tube wall prevents blood from freezing in the tube. Tests on blood preserved by the apparatus shown in FIG. 6 show that 80% of the useful human blood is preserved and that, the product may be maintained indefinitely in its frozen condition.

While there have been described in detail herein and illustrated in the accompanying drawings certain presently-preferred embodiments of this apparatus, it is to be understood that various modifications, omissions and refinements which depart from the disclosed embodiments may be adopted without departing from the spirit and scope of this invention. In each embodiment the cold gas which is used to freeze the liquid particles in the freezing chamber may be any suitable gaseous medium which will not react adversely with the liquid being frozen. Thus, while nitrogen is advantageous as the gaseous medium for freezing orange juice, for other liquids the cold gaseous medium may be any other suitable gas, including air. Also, if desired, the freezing chamber may be maintained under partial vacuum instead of at a pressure just slightly above atmospheric pressure.

This application is a continuation-in-part of my co-pending application Serial No. 774,263, filed November 17, 1958, and accordingly is a continuation-in-part of my co-pending application Serial No. 667,312, filed June 20, 1957, now abandoned.

What is claimed is:

1. Apparatus for freezing a liquid which comprises means defining a freezing chamber, means for circulating a non-oxidizing inert, cold gas in a continuous stream and in a continuously gaseous state through said freezing chamber, means for maintaining said gas cooled to a temperature which is nondeterimental to said liquid, means for discharging into said cold gas stream in substantially the same direction as the latter in the chamber a fine spray of droplets of said cold liquid which are substantially all smaller than 500 microns in diameter and which freeze individually substantially instantaneously upon contact with said gas, and means for collecting and compacting said frozen droplets.

2. Apparatus for freezing a liquid comprising a freezing chamber, a rotating spray head in said chamber arranged to discharge liquid thereinto in the form of small particles, means for passing to said spray head the liquid which is to be frozen and means for passing into said freezing chamber close to said spray head a cold gas which is in a gaseous state as it enters said chambers and which is non-detrimental to said liquid at a temperature effective to freeze said liquid as individual small particles and wherein there is provided a heat exchanger ahead of said spray head for heating the liquid to prevent freezing of the liquid before it is discharged from the spray head.

References Cited in the file of this patent

UNITED STATES PATENTS

| | | |
|---|---|---|
| 1,104,920 | Osborne | July 28, 1914 |
| 1,738,879 | Epperson | Dec. 10, 1929 |
| 1,976,204 | Voorhees | Oct. 9, 1934 |
| 2,020,719 | Bottoms | Nov. 12, 1935 |
| 2,412,203 | Brunkhurst | Dec. 10, 1946 |

FOREIGN PATENTS

| | | |
|---|---|---|
| 102,539 | Sweden | Sept. 16, 1941 |